Figure 1:
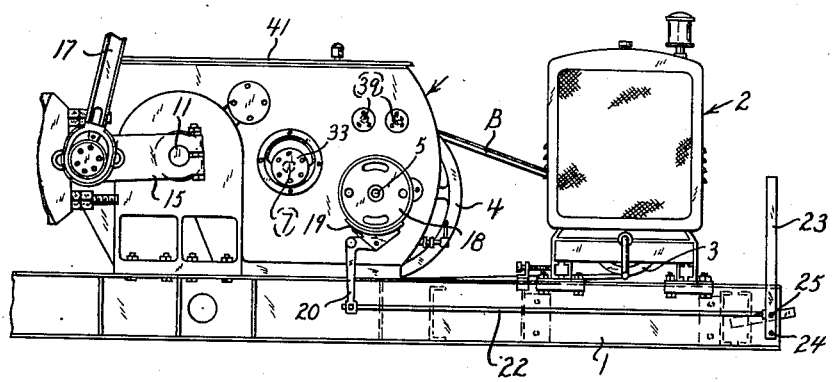

Dec. 16, 1952  W. SIEGERIST  2,621,530
INTERNAL SYNCHRONIZED ECCENTRIC CHAIN TENSION ADJUSTER
Filed Jan. 5, 1948  3 Sheets-Sheet 1

INVENTOR;
Walter Siegerist,
BY Carr & Carr & Gravely,
HIS ATTORNEYS

Dec. 16, 1952   W. SIEGERIST   2,621,530
INTERNAL SYNCHRONIZED ECCENTRIC CHAIN TENSION ADJUSTER
Filed Jan. 5, 1948   3 Sheets-Sheet 2

INVENTORS:
Walter Siegerist,
BY Carr & Carr & Gravely,
HIS ATTORNEYS

Dec. 16, 1952     W. SIEGERIST     2,621,530
INTERNAL SYNCHRONIZED ECCENTRIC CHAIN TENSION ADJUSTER
Filed Jan. 5, 1948     3 Sheets-Sheet 3
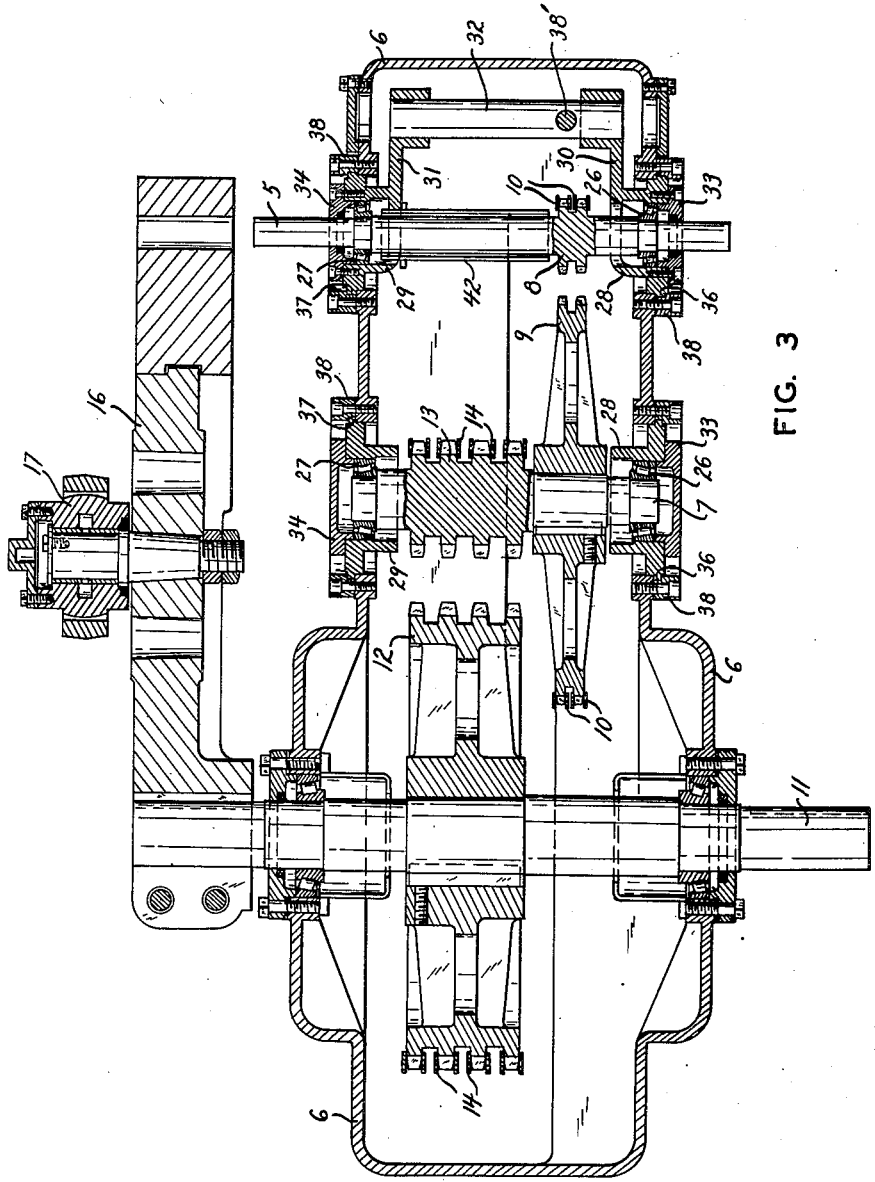
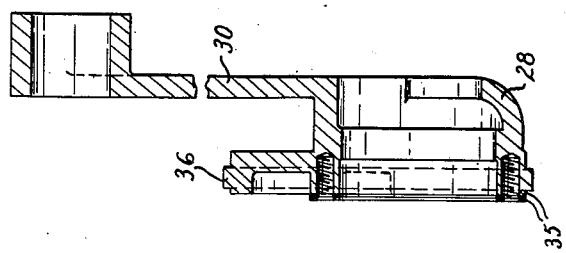
INVENTOR;
Walter Siegerist
BY Carr & Carr & Gravely,
HIS ATTORNEYS Patented Dec. 16, 1952

2,621,530

UNITED STATES PATENT OFFICE 2,621,530

INTERNAL SYNCHRONIZED ECCENTRIC CHAIN TENSION ADJUSTER

Walter Siegerist, University City, Mo.

Application January 5, 1948, Serial No. 529

10 Claims. (Cl. 74—242.16)

This invention relates to power transmission mechanisms and is more particularly directed to a means for tensioning the chain belts in such power transmission mechanisms.

The object of this invention is to provide a means for tensioning the chain belts in power transmission mechanisms so that the axes of the shafts on which the chain gears are mounted will be moved and remain parallel to each other during tension adjustments.

Another object of the invention is to provide a tension adjusting means for the chain belt drives in power transmission mechanisms which will move the shafts carrying the chain belt gears so as to keep their axes parallel and in which the adjusting mechanism is disposed in a housing for the power transmission mechanisms.

Another object of the invention is to provide an improved anti-friction bearing mounting and adjusting means particularly useful in power transmission mechanisms.

Figure 4:
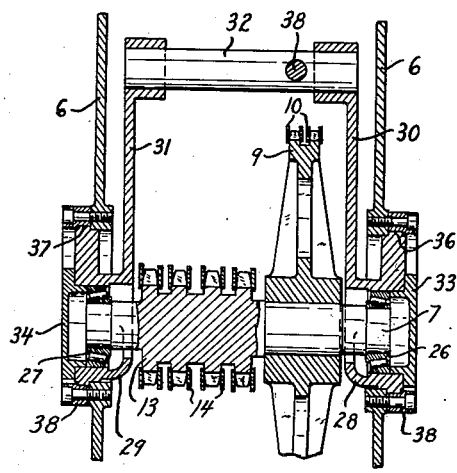
Figure 2:
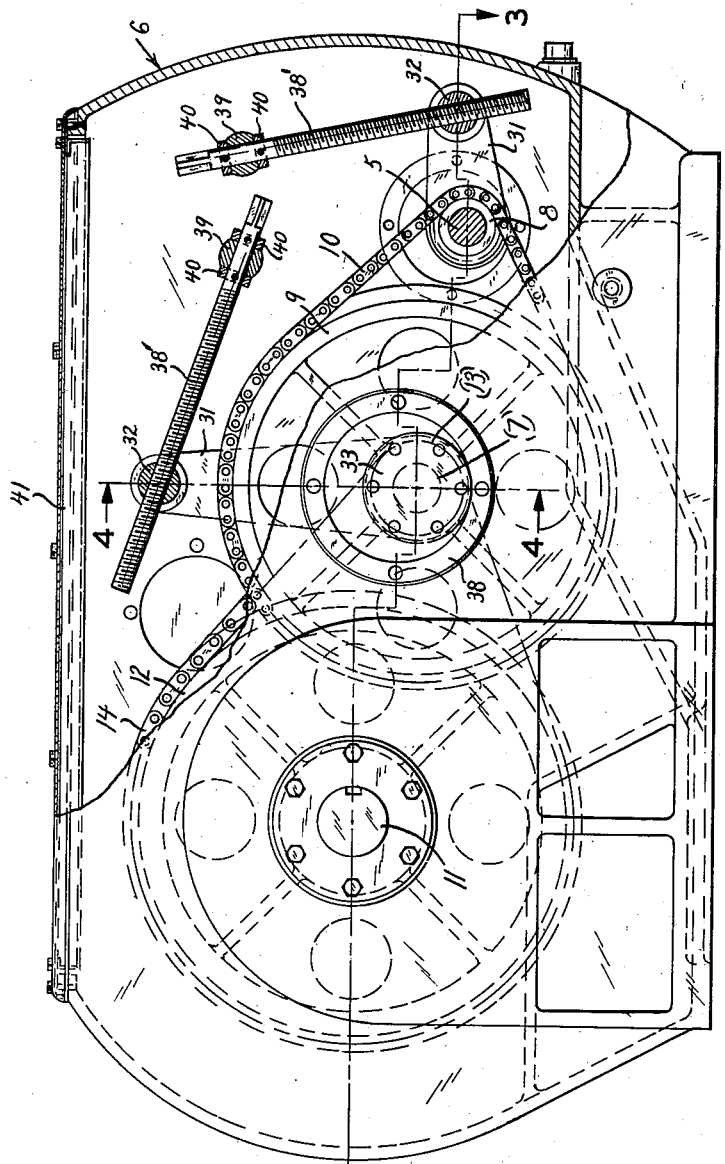
Figure 6:
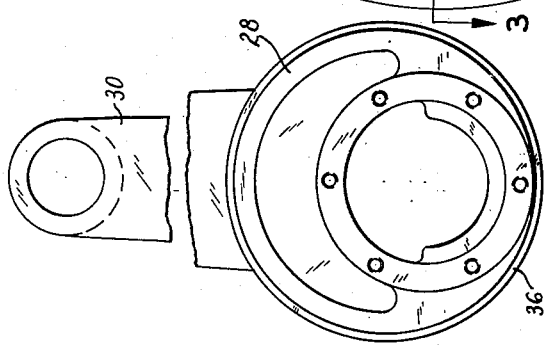

In the drawings:

Fig. 1 is an elevational view of a portion of a device employing the improved power transmission mechanisms, Fig. 2 is an enlarged side elevation view of the power transmission mechanism with parts broken away to show constructional detail, Fig. 3 is a section view taken along the line 3—3 of Fig. 2, Fig. 4 is a section view taken along the line 4—4 of Fig. 2; and Figs. 5 and 6 are section and end views of the bearing support and adjusting arms.

The instant invention is particularly useful in oil well pumping devices or similar mechanisms and by suitable modification can be applicable to a wide variety of other devices in which chain belt drives are employed. One installation in which the instant invention has been found to produce advantageous results is in walking beam type of deep well pump, a portion of which mechanism is illustrated in Fig. 1 in which numeral 1 designates the frame member on which a suitable prime mover, e. g., an internal combustion engine 2 is mounted. The output end of the engine is provided with a sheave 3 which is connected to a sheave 4 secured to a shaft 5 by a belt "B," the shaft 5 being rotatably mounted in a casing 6 that is suitably secured to the frame member 1. Disposed in parallel relation to the shaft 5 is another shaft 7 rotatably mounted in casing 6 whose axis is parallel to that of shaft 5. Shaft 5 has a chain belt gear 8 formed thereon which is aligned with a chain belt gear 9 secured to shaft 7 with the two gears connected by a chain belt 10. A third shaft 11 is rotatably mounted in casing 6 whose axis is parallel to shafts 5 and 7. A chain belt gear 12 is secured to shaft 11 that is aligned with a second chain belt gear 13 formed on shaft 7, the two gears being connected by chain belt 14. Secured to the exposed ends of shaft 11 are suitable cranks 15 and 16 that are pivotally connected to levers 17, only one of which is shown, that operate a walking beam or any other device that may be driven thereby.

Shaft 5 has a brake drum 18 mounted on one end thereof, as shown in Fig. 1, which is engageable with a suitable brake shoe 19 actuated by bell crank 20 pivotally connected to the casing 6. One arm of bell crank 20 is connected to rod 22 that is axially moved by a lever 23 pivotally connected to the frame 1 at 24 with rod 22 being pivotally connected to lever 23 by a pin 25.

The power transmission illustrated is a double reduction unit and, therefore, shafts 5 and 7 are capable of adjustment relative to each other. This adjustment is accomplished by devices capable of moving both ends of the shafts simultaneously. Since both devices are the same in construction and operating principle, only one will be described in detail, it being understood that each shaft is similarly equipped.

Shaft 5 is rotatably supported in antifriction bearings 26 and 27, each of which is received in similarly constructed housings 28 and 29. Each of these housings has radial arms 30 and 31 integrally connected thereto, the outer ends of which are suitably apertured with rod 32 inserted in the apertures to rigidly connect the outer ends of the radial arms and the associated housings. The bearings are covered by plates 33 and 34 which are secured to the housings 28 and 29 by suitable securing means. The bearings are adjusted in the housings by shims or spacers 35, 35 (Fig. 5). The housings 28, 29 are rotatably disposed in casing 6 on an axis that is eccentric to the axis of shaft 5 and to accomplish this rotational relationship, each housing is provided with collars 36, 37 one of whose sides engages the side walls of casing 6. Cover plates 38, which are bolted to the casing 6, clamp the housings 28 and 29 in position relative to shaft 5.

The arms 30 and 31 and their associated housings 28 and 29 are rotated by means of a screw 38' threaded into rod 32. This screw is pivotally supported on the side walls of casing 6 by means of member 39. The screw has collars 40, 40 secured thereto to keep the screw in member 39 and to permit relative rotation therewith and has a squared end to which a wrench can be applied. Access cannot be had to this adjusting means from the exterior of the housing but cover 41 must be removed before adjustment, it being understood that ring plate 38 is free to the extent of slacking off the set screws about one turn, to permit easy rotation of eccentric plate 36.

The adjustment and mounting for shaft 7 is similar to that shown for shaft 5 and all parts illustrated in connection therewith are numbered the same.

The procedure in lining up a double reduction unit, as shown in the drawings, is to adjust the intermediate shaft 7 first by means of screw 38' and the parts operated thereby so that the proper tension exists in the chain 14 connected between the chain gear 12 on shaft 11 and the chain gear 13 on shaft 7. When this has been done, then the proper tension between shafts 7 and 5 is adjusted by means of similar eccentric adjustment arrangements. Both adjustments are made by the mechanic by means of an ordinary wrench after taking off the top cover 41 of the housing. Thus it can be readily seen that all of the adjustment is made without any special tools and after it has been made, the cover is bolted back into position; therefore, insuring that the adjustment will not be tampered with by anyone who may have such intentions. The final operation consists of tightening the securing means in the clamping plate 38 outside of the case. This clamping plate is primarily for the purpose of insuring an oil-tight seal between the case and the eccentric arm. The design incorporates the arm or crank of the adjusting eccentric and the adjusting eccentric surface into an integral unit. It is, therefore, impossible to ever disturb the alignment between the synchronizing arm and the adjusting eccentric. The accuracy of the entire unit, therefore, will always be equal to the machining tolerances of the shop that produces it. Another important feature of my eccentric arm design is the fact that it is so proportioned that the arms are introduced from the outside of the case. In other words, each adjusting arm passes through its own hole, thus affording a very simple assembly procedure. Each of the adjusting arms, furthermore, is designed with an oil well for lubricating the bearings. Part 42 is a drain or oil catcher carrying oil over to the well in the adjusting arm. This device is not needed on the opposite side because the drippage from the chain itself fills the well.

The principle of operation described above is employable in a single reduction unit wherein only two shafts such as either 5 or 7 and associated structure would be used in connection with shaft 11, thereby requiring only one chain belt and two sprocket gears.

What I claim is:

1. A chain driven transmission unit comprising a casing; a shaft rotatably mounted in said casing; a second shaft rotatably mounted in said casing; sprockets mounted on each shaft; a chain belt connected between said sprockets; an individual housing supported on each end of the second shaft and rotatably mounted in said casing, the axis of rotation of the shaft being eccentric to the axis of rotation of said housing; and means connecting the housings on each shaft for simultaneously and synchronously rotating said housings in the casing for tensioning the chain connecting the shafts.

2. A chain driven transmission unit which comprises a casing; a pair of shafts rotatably mounted in said casing and each provided with a sprocket; a chain belt connecting said sprockets; a bearing mounted on the end of each shaft; an individual housing for receiving each bearing on each of said shafts, the housings on one of said shafts being rotatable in the casing on an axis eccentric to said axis of the shaft mounted therein; and means connecting the housings on one of said shafts for simultaneously and synchronously rotating the rotatable bearing housings to thereby tension said chain belt.

3. A chain driven transmission unit which comprises a pair of shafts rotatably mounted in a casing and each provided with a sprocket; a chain belt connecting said sprockets; a bearing mounted on the end of each shaft; a housing for receiving each bearing on one of said shafts and rotatable on an axis eccentric to said shaft axis of rotation; an arm associated with each bearing housing; a rod connected between said arms; and means operatively associated with said rod to rotate said arms and associated housings to thereby tension said chain belt.

4. A chain driven transmission unit which comprises a casing; a pair of shafts rotatably mounted in said casing and each provided with a sprocket; a chain belt connecting said sprockets; a bearing mounted on the end of each shaft; an individual housing for receiving each bearing on one of said shafts and rotatable in said casing on an axis eccentric to said shaft axis; means to retain the bearings in said housing; means to adjust the position of each bearing in its housing; and means connecting the housings on one of said shafts for simultaneously and synchronously rotating the bearing housing to thereby tension said chain.

5. A chain driven transmission unit which comprises a casing; a pair of shafts rotatably mounted in said casing and each provided with a sprocket; a chain belt connecting said sprockets; a bearing mounted on the end of each shaft; an individual housing for receiving each bearing on one of said shafts and rotatable in said casing on an axis eccentric to said shaft axis of rotation; and means connecting the housings on one of said shafts for simultaneously and synchronously rotating the housings for moving one shaft toward and away from the other in a parallel relation to thereby tension said chain belt.

6. A chain driven transmission unit which comprises a pair of shafts rotatably mounted in a casing and each provided with a sprocket; a chain belt connecting said sprockets; a bearing mounted on the end of each shaft; a housing for receiving each bearing on one of said shafts and rotatable on an axis eccentric to said shaft axis; and means to rotate said housings to move one shaft toward and away from the other which comprises a rod to connect said housings together, a screw threaded member pivotally secured in said casing and operatively associated with said rod, said threaded member when rotated varying the distance between said shafts to thereby tension said chain belt.

7. A belt driven transmission unit which comprises a casing; a pair of shafts rotatably mounted in said casing and each provided with chain belt receiving members; a chain belt connecting said members; a bearing mounted on the end of each shaft; an individual housing for receiving each bearing on one of said shafts and rotatable in said casing on an axis eccentric to said shaft axis of rotation; and means connecting the housing on one of said shafts for simultaneously and synchronously rotating the housings for moving one shaft toward and away from the other in a parallel relation to thereby tension said chain belt.

8. A belt driven transmission unit which comprises a pair of shafts rotatably mounted in a casing and each provided with chain belt receiving members; a chain belt connecting said members; a bearing mounted on the end of each shaft; a housing for receiving each bearing on one of said shafts and rotatable on an axis eccentric to said shaft axis; and means to rotate said housings to move one shaft toward and away from the other which comprises a rod to connect said housings together; a screw threaded member pivotally secured in said casing and operatively associated with said rod, said threaded member when rotated varying the distance between said shafts to thereby tension said chain belt.

9. A belt driven transmission unit which comprises a casing; a pair of shafts rotatably mounted in said casing and each provided with chain belt receiving members; a chain belt connecting said members; a bearing mounted on the end of each shaft; an individual housing for receiving each bearing on each of said shafts, the housings on one of said shafts being rotatable in said casing on an axis eccentric to said axis of the shaft mounted therein; and means connecting the housings on one of said shafts for simultaneously and synchronously rotating the rotatable bearing housings to thereby tension said chain belt.

10. A power transmission unit comprising a casing, a shaft rotatably supported in said casing; a second shaft rotatably supported in said casing; gear means mounted on each shaft; a flexible power transmitting means connecting said gear means; an individual housing mounted on each end of said second shaft and rotatably supported in said casing, a bearing in each of said housings rotatably supporting said second shaft, the axis of rotation of said second shaft being eccentric to the axis of rotation of said housings; and means connecting the housings on one of said shafts for simultaneously and synchronously rotating the housings to thereby tension said flexible power transmitting means.

WALTER SIEGERIST.

REFERENCES CITED

The following references are of record in the file of this patent:

UNITED STATES PATENTS

| Number | Name | Date |
| --- | --- | --- |
| 306,560 | Van de Water | Oct. 14, 1884 |
| 1,467,591 | Riker | Sept. 11, 1923 |
| 1,523,676 | Trussell | Jan. 20, 1925 |
| 1,580,303 | Lawson | Apr. 13, 1926 |